Patented June 18, 1929.

1,717,924

UNITED STATES PATENT OFFICE.

JULIUS J. HORAK, OF SAN FRANCISCO, CALIFORNIA, ASSIGNOR TO ALBERT A. HEMMEN, OF SAN FRANCISCO, CALIFORNIA.

PAINT.

No Drawing. Application filed June 28, 1926. Serial No. 119,238.

This invention relates to paint generally, but specifically to a water-oil paint,—or that is, a paint of which the vehicle is mainly water but which after drying out leaves a compound oily filmed paint.

The objects of the invention are to provide a paint which will be cheap to manufacture, of good covering qualities, easy of application, free from skinning tendency, and which tho initially miscible with water will after drying become insoluble in water within a few days and be proof against the action of air and moisture both from above or below the film of paint, particularly so that the paint when applied on concrete or other surfaces which are not quite dry will nevertheless adhere perfectly to act as a finish coat or serve as a highly adherent foundation coat for a further coat of oil paint, varnish, or other top coat.

In making my paint considerable latitude may be exercised in combining the ingredients, but practice has shown it best to first prepare the following solutions:

BINDER

Formula A
Animal glue_____ 10 kilograms
Water _____ 20 kilograms
soak over night and add
Ammonium-sulpho-cyanate_____ 1 kilogram
After 2 or 3 days (if very cool 4 to 6 days) the glue will have become perfectly liquid and may be stored without decomposing.

WATERPROOFING PASTE

Formula B
Solution b1

Aqua ammonia (50%) _____ 4 liters
Rosin _____ 1 kilogram
boil until the rosin is completely dissolved then remove from heat and add
Aqua ammonia (50%) solution_____ 1 liter
This will replace the amount of ammonia evaporated during the process of dissolving the rosin.

Solution b2

Linseed oil soap_____ 200 grams
Hot water_____ 1 liter
when all the soap is dissolved add slowly
Linseed oil (preferably boiled)_____ 1 liter
stirring well. While still hot pour Solution b1 slowly into Solution b2 with constant stirring. Other drying oils may be used, but linseed is preferred.

Formula C
Rosin_____ 1 kilogram
Kauri gum_____ 150 grams
Stearic acid_____ 50 grams
Cobalt, lead or manganese linoleate_____ 50 grams
Linseed oil (preferably boiled)_____ 750 cubic centimeters
apply heat until the mass becomes liquid.
Let it cool for a while and slowly add
Aqua ammonia (50%)_____ 4 liters
stirring well until cool.

Formula D
Waterproofing paste without ammonia

Solution d1

Rosin_____ 600 grams
Linseed oil (preferably boiled)_____ 2 liters
Cobalt, manganese or lead linoleate_____ 20 grams
apply heat until the rosin is completely dissolved.
Then prepare a solution of:

Solution d2

Linseed oil soap_____ 300 grams
Hot water_____ 2½ liters
Pour Solution d1 into Solution d2 while still hot, stirring continually.

Formula E.
A durable waterproofing paste for outside work can be made by mixing 1 part of Formula B, or C, with one to two parts of Formula D.

To make a ready mixed paint from the above prepared formulas I incorporate with certain proportions thereof certain dry bases such as whiting, china-clay, asbestine, and zinc oxide, the particular base depending on the particular service demanded of the paint or its color.

The whiting and zinc oxide either singly or mixed being more suitable for inside work, and the asbestine particularly suitable for outside white, tho various quantities of any or all may be combined in some cases.

The base, together with the desired amount of any dry mineral color is ground with a quantity of Formula A to a soft pasty condition and after which about half its weight of the waterproofing paste—B—C—D or E, preferably the latter is added and worked up in a mixing machine.

The proper consistency for a free flowing and smooth working paint will soon be determined by experience and may easily be controlled by varying the amount of the dry base, or if slightly too stiff when finished it may be rendered more fluid by further incorporating therewith of a quantity of Formula A, either full strength or diluted, and of again thoroughly mixing the compound.

The above paint possesses great penetrating properties especially on damp surfaces where ordinary oil paints would be repelled. The sulpho-cyanate in the glue solution has a special value in a paint of this kind discovered by me, as it maintains the glue in permanent liquid condition without loss of adhesive qualities common with other liquefying agents thus making the paint flow well at all ordinary temperatures, while at the same time insuring that the paint will get a firm grip upon the painted surface without danger of the peeling tendency so troublesome with paint using glue as a binder, and while the special glue solution acts as an initial binder the slow oxidization of the linseed oil liberated by gradual escape of the ammonia aided by the catalytic action of the linoleate appears to insulate the glue molecules or surround them with a waterproof film so that substantially the resistance of a linseed oil paint is secured, all at a cost which is but a fraction of a linseed oil paint, and the paint possesses a covering power superior to the average oil paint of similar body.

I claim:

1. A paint comprising a mixture of a mineral base, rosin cut in ammonia, linseed oil, a linoleate, and an aqueous solution of animal glue.

2. A paint comprising a mixture of a mineral base, rosin cut in ammonia, linseed oil, a linoleate, and an aqueous solution of animal glue treated with an alkili sulpho-cyanate.

3. A paint comprising a mixture of a mineral base, rosin cut in ammonia, linseed oil, a linoleate, and an aqueous solution of animal glue treated with ammonium sulpho-cyanate.

4. A paint comprising a mixture of a mineral base, rosin cut in ammonia, linseed oil, a metal linoleate, linseed oil soap and an aqueous solution of animal glue.

5. A paint as specified in claim 1 containing in addition kauri gum.

6. A paint as specified in claim 1 containing in addition stearic acid.

7. A paint of the character described containing an aqueous glue solution, a mineral base, linseed oil, soap and rosin.

8. A paint of the character described containing an aqueous glue solution, a mineral base, linseed oil, soap, rosin, kauri gum, stearic acid and a metal linoleate.

9. A paint of the character described containing linseed oil, ammonia and a metal linoleate.

10. A paint of the character described containing an aqueous glue solution and an alkali sulpho-cyanate.

11. A paint of the character described containing an aqueous glue solution and ammonium sulpho-cyanate.

JULIUS J. HORAK.